D. DENNETT.

Hay-Rack.

No. 55,829.

Patented June 26, 1866.

Witnesses.
Geo. H. Knight
L. B. Dennett

Inventor,
Daniel Dennett

UNITED STATES PATENT OFFICE.

DANIEL DENNETT, OF BUXTON, MAINE.

IMPROVEMENT IN HAY-RACKS FOR WAGONS.

Specification forming part of Letters Patent No. 55,829, dated June 26, 1866.

*To all whom it may concern:*

Be it known that I, DANIEL DENNETT, of Buxton, on the county of York and State of Maine, have invented a new and useful Improvement on Hay-Racks for the purpose of drawing in hay and other strawy crops; and I do declare that the following is a full, clear, and exact description of the construction of the same, reference being had to the annexed drawings, and the figures and letters marked thereon, making a part of this specification, in which—

Figure 1:
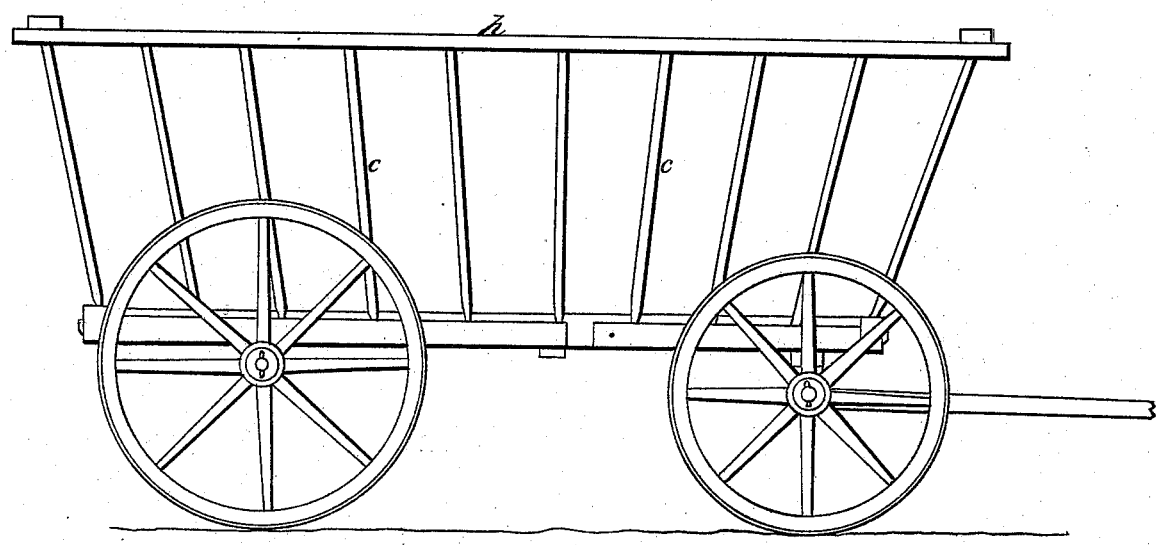
Figure 2:
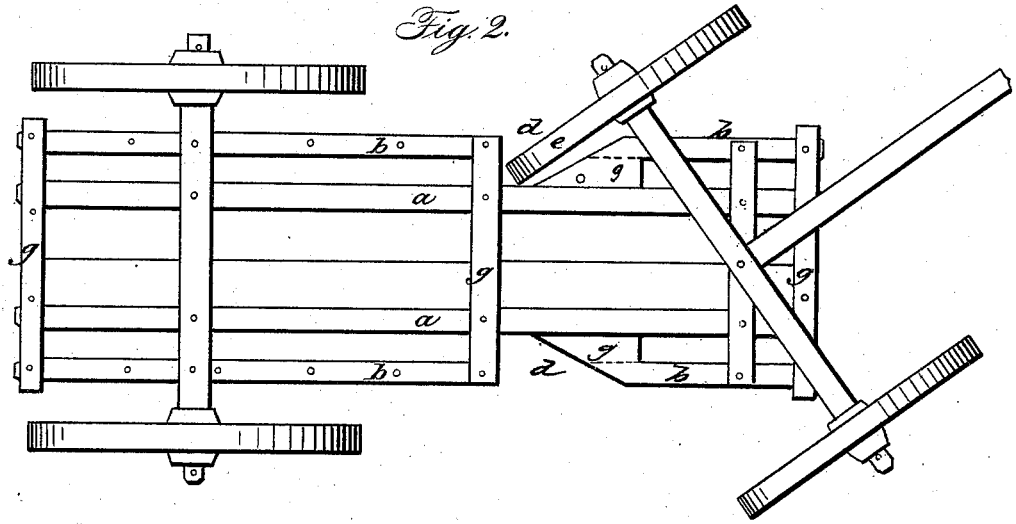

Figure 1 is a perspective view, and Fig. 2 is a view of the bottom, of said hay-rack, showing the manner of construction and the novelty claimed.

This hay-rack is designed to be used only upon wagons or vehicles with four wheels, and to remedy the difficulty in turning the wagon encountered when a common hay-rack is used.

This invention enables the use of large fore wheels instead of small ones, which renders the draft of the wagon much easier.

It also permits the hay-rack to be made much wider than common hay-racks, the cavity $d$, receiving the fore wheel in turning, enabling the stretchers $b\ b\ b\ b$ to be placed far outside of the stretchers $a\ a$ and close to the hubs of the wheels.

The stretchers $a\ a$ sustain the burden of the load, and extend the entire length of the rack, and are placed inside of the stretchers $b\ b\ b\ b$ far enough to let in the wheel sufficiently to permit the wagon to turn readily.

The stretchers $b\ b\ b\ b$ are arranged outside of the stretchers $a\ a$, and are used only to sustain the lower ends of the balusters $c\ c$, and are connected with each other and with the stretchers $a\ a$ by the bars $g\ g\ g\ g\ g$, and their excision, in the manner represented in Fig. 2, forms the cavity $d$, which receives the fore wheel and facilitates the turning of the wagon within a small space, which is the object of this invention.

What I claim as my invention, and desire to secure by Letters Patent, is—

The stretchers $b\ b\ b\ b$, cut in two at $d\ d$, in the manner and for the purposes specified.

DANIEL DENNETT.

Witnesses:
A. A. DENNETT,
R. G. DENNETT.